A. LACKMAN.
PROCESS OF FERMENTING SULFITE LIQUOR.
APPLICATION FILED FEB. 26, 1912.
1,269,287.
Patented June 11, 1918.
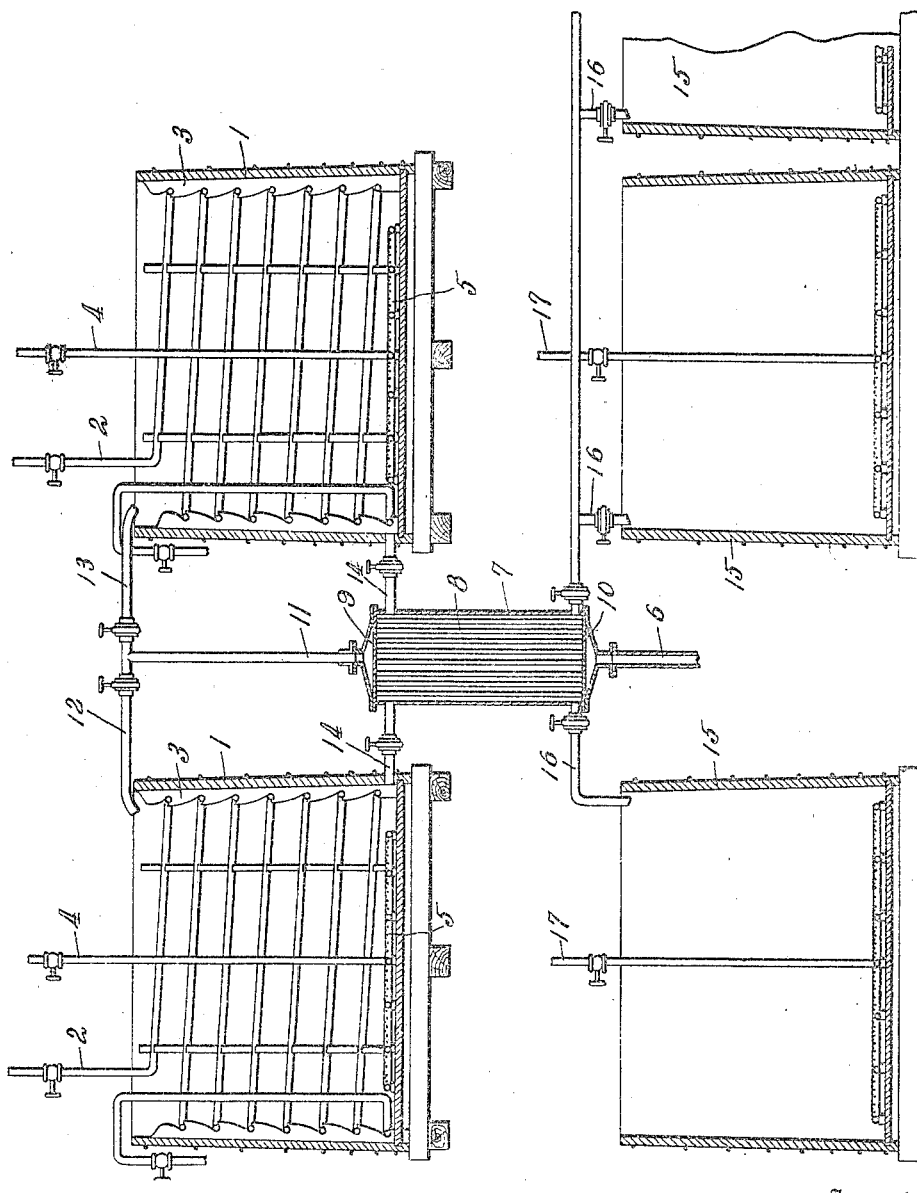
Inventor
Alexander Lackman
Witnesses
By K. P. McElroy
Attorney

UNITED STATES PATENT OFFICE.

ALEXANDER LACKMAN, OF NEW YORK, N. Y.

PROCESS OF FERMENTING SULFITE LIQUOR.

1,269,287.

Specification of Letters Patent.

Patented June 11, 1918.

Application filed February 28, 1912. Serial No. 679,836.

*To all whom it may concern:*

Be it known that I, ALEXANDER LACKMAN, formerly a citizen of Germany but now a citizen of the United States, residing at New York, in the county of New York and State of New York, have invented certain new and useful Improvements in Processes of Fermenting Sulfite Liquor, of which the following is a specification.

This invention relates to processes of fermenting sulfite liquor; and it comprises a method of treating waste sulfite liquor to produce alcohol and other valuable products therefrom wherein such waste sulfite liquor is acidified in a heated state with a minimal amount of strong acid, best sulfuric acid, to displace sulfurous acid existing as such and as sulfites, is cooled and fermented and is then distilled and concentrated; all as more fully hereinafter set forth and as claimed.

Waste sulfite liquor is the watery liquid resulting from the digestion of wood and the like under pressure with a solution of a bisulfite, such as bisulfite of lime or a mixture of the bisulfites of lime and magnesia, dolomitic lime, in this country, being often employed in making the original bisulfite solution. About half the wood remains undissolved as cellulose or paper pulp while the residue (the portion usually called "lignone") goes into solution to form various complex organic bodies containing sulfur. As these bodies are, at least in part, in the nature of sulfonic acids, united to the bases present (lime or lime and magnesia, usually) the dissolved organic matters are ordinarily called, for the sake of a name, "lignosulfonates." This being a convenient term, it will be used.

As the hot liquor leaves the digester, the release of pressure causes most of the dissolved sulfur dioxid or sulfurous acid, existing as such, to flash into gas; and similarly, the bulk of the bisulfites, existing as such, are decomposed with a liberation of sulfur dioxid. Most of the sulfur dioxid of the original bisulfite solution having gone into organic combination is no longer present as sulfurous acid or sulfites; and most of the residue of that which is present in that form disappears in this releasing operation. Such neutral sulfite of calcium as is formed by expulsion of the sulfur dioxid mostly separates out since it is an insoluble salt.

Assuming that a typical analysis of the light or unconcentrated liquor as it comes from the digesters will show it to contain about 6 to 7 per cent. total solids, the total amount of sulfur existing in the liquid will be around 0.87 per cent. Most of this is in organic combination and in other forms than $SO_2$; and the total amount of $SO_2$ present as such and as sulfites and bisulfites is only about 0.08.

The organic matter present is not all lignosulfonate; part of it being of a carbohydrate nature and fermentable. The cooled liquid can be directly fermented to yield a little alcohol; but this is a difficult and tedious operation, this being due largely to the antiseptic effect of the sulfites and sulfurous acid present. The amount of these antiseptic bodies is, as just pointed out, not large; but the yeast organism is quite susceptible to their effects. These sulfites cannot be removed with any sufficient degree of completeness by merely neutralizing the liquid with lime. The neutral calcium sulfite formed is not sufficiently insoluble to prevent its harming the yeast; and, because of the small amount actually present it is difficult to separate it by filter-pressing or decantation. The other sulfur combinations present do not seem to affect yeast materially.

In commercial practice, the waste sulfite liquor is usually evaporated at low temperatures after a careful neutralization to yield a concentrated stable liquid, (Patent 833,634) which may serve as an adhesive, as a material for tanning preparations or "extracts," for road-making, etc. For most of the purposes to which the concentrated liquor is applied, its contents of the lignosulfonates, or the characteristic organic complexes derived from lignone, is important. And for this reason it is desirable to free it of the carbohydrates which have less value for the stated purposes. By fermenting them, alcohol is produced, and this if recovered may help pay the expense of the operation, while the soluble solids of the residue left after fermentation contain a concomitantly greater percentage of the more valuable lignosulfonates. In a tanning preparation made by concentrating unfermented liquor and, of say, 30° Baumé density, an analysis made by the usual methods of tannin determination may show, say, 25 per cent. and over of non-tans while a similar preparation made from the liquid submitted to a preliminary fermentation on analysis may show 18 to 20 per cent. or less non-tans. This is an important practical difference. Similarly, the concentrated liquid made from the fermented liquor is better as an adhesive and is better for many other purposes, as in treating roadways to produce useful changes in clay and clay-yielding materials present.

I have found that by a careful treatment with a small amount of acid, which is best sulfuric acid, the small amount of residual sulfurous acid and sulfites may be expelled without producing any such change in the liquid as will injure the residual valuable lignosulfonates, or leaving the liquor acid in a manner detrimental to yeast. Any excess of acid by hydrolizing other sulfur compounds than sulfite will develop more sulfites. Lactic acid may be used in lieu of sulfuric. Hydrochloric or oxalic acids may also be used in lieu of sulfuric acid but are more expensive and are not more advantageous. After this acidifying operation, the liquid can be fermented in about a quarter the time necessary to bring the untreated liquid to a similar degree of fermentation.

An addition of about 0.02 per cent. sulfuric acid to the liquid of the strength at which it leaves the digester is generally sufficient though this amount will vary a little one way or the other according to the amount of sulfites present. As a general rule, the addition should be about the amount which is equivalent to the sulfites present. In order to secure a ready and complete expulsion of the sulfur dioxid, the liquid should be hot; and it may advantageously be at a boiling temperature. For the same reason, the liquid is advantageously filmed, sprayed or made into shallow layers; or it may be air-blown. Using these expedients to get rid of the sulfurous acid, some incidental evaporation takes place which is also advantageous.

The hot liquid coming directly from the digester may be treated with the acid, being thereafter filmed, sprayed, air blown or otherwise caused to expose a large surface for evaporation and for the removal of the sulfurous acid. Or it may be further heated in any suitable way; as by the use of steam coils or steam jets. After expulsion of the sulfurous acid, the liquid should be cooled and fermented by an addition of yeast; the fermentation being conducted in the ordinary way. It is advantageous but not necessary to use cultures of yeast made from organisms which have been accustomed to sulfite liquor.

In order to secure an economy of heat, the liquid to be treated may be run through a heat-interchanger, taking up heat from outgoing treated liquor, to a treating vessel where it is treated by adding the desired minimal amount of acid and freed of sulfurous acid by filming, spraying or air blasting. The purified liquid may then be led away through the heat interchanger (where it gives up heat to incoming liquid), further cooled if necessary and then fermented. After the fermentation, the alcohol may be distilled off and recovered and then the residual liquid concentrated to the desired degree; generally about 30° Baumé this being a standard commercial density for liquids of this character. Fermentation is generally complete in a single day.

Any desired type of apparatus may be used for the distillation and concentration; as for example ordinary alcohol stills, such as column stills and charge stills treating the fermented liquid and multiple effects, or other evaporators, treating the dealcoholized liquid. Multiple effect evaporators working with low pressure steam in the heating elements of the first effect are desirable.

After the evaporation the concentrated liquid may be treated to convert the calcium lignosulfonate into the corresponding aluminum or chomium salt; as by adding a concentrated solution of alumina or chromium sulfate and filtering off or otherwise removing the calcium sulfate produced in the reaction. This gives a desirable type of tanning preparations or extracts freed of much inert fermentable matter, and comparatively high in tanning constituents. The sesqui-oxid bases, alumina and chromium oxids have good tanning properties. The same is true of preparations made with iron sesquioxid; but the iron preparations give a leather with a color which is not liked.

In the accompanying illustration, I have shown more or less diagrammatically certain apparatus useful in the performance of the described process.

In this showing, 1, 1 are a pair of vats or digesters for treating the sulfite liquor to remove acid. Each is shown provided with a steam coil 2 hung on hangers 3, and with air blowing device 4 terminating in a minutely perforated pipe 5. Inlet 6 to heat interchanger 7, provided with internal tubes 8, between headers 9 and 10, provides for the introduction of raw sulfite liquor which, passing through the heat interchanger and taking up heat, goes through 11 through either of valved pipes 12 or 13 according to the acid liberating device which may be in use. Treated liquor leaves this acid liberating apparatus through valved pipe 14 and passes through the heat interchanger passing around the internal tubes and giving up its heat to inflowing liquor. From the heat interchanger, the treated liquor may go to any one of a plurality of fermenting vats 15, 15, 15. As many of these fermenting vats may be used as the capacity of the plant requires. Valved pipes 16 provide for the introduction of the treated liquor into the particular vat in which it is required. Air pipe 17 may be used to stir and aerate the liquor prior to adding the yeast.

In the use of the foregoing structure one of the vats (1) may be filled with sulfite waste liquor and heated with exhaust or live steam to the desired degree. The heating coils may advantageously be of lead. When the liquor has nearly reached the boiling point, compressed air, or steam, but advantageously air, is turned on through pipe 4. Acid is now added in the small amount necessary to react with the sulfites. Sulfur dioxid will escape with the air and at the same time some evaporation will take place causing the liquor to become somewhat more concentrated. When the sulfur dioxid is substantially expelled, the hot liquid is sent through the heat interchanger by 14, and thence to a fermenting vat while fresh liquid from 6, passing up through the interchanger and into the other vat, takes up the heat from the outflowing hot treated liquid. The flow of liquid should be so regulated that the liquid going to the fermentation tank is at about 90° F., this being the best temperature for quick and complete fermentation. Special coolers may be used in addition to the heat interchanger if desired; but the heat interchanger with proper operation is sufficient. Fermentation in the fermenting vats is as usual. With the liquor at about 90° F., fermentation goes on very quickly and may be finished in less than 24 hours instead of the two or three days requisite with untreated liquor.

What I claim is:—

1. The process of treating sulfite liquor which comprises adding sulfuric acid to the hot liquor in substantially the amount equivalent to $SO_2$ and sulfites present, removing the sulfur dioxid in gaseous form and fermenting the acidified liquor.

2. The process of treating sulfite liquor which comprises adding an acid to the hot liquor in substantially the amount equivalent to $SO_2$ and sulfites present, removing the sulfur dioxid in gaseous form and fermenting the acidified liquor.

3. The process of treating sulfite liquor which comprises adding an acid to the hot liquor in substantially the amount equivalent to $SO_2$ and sulfites present, removing the sulfur dioxid in gaseous form, fermenting the acidified liquor and removing the alcohol.

4. The process of treating sulfite liquor which comprises adding an acid to the hot liquor in substantially the amount equivalent to $SO_2$ and sulfites present, removing the sulfur dioxid in gaseous form, fermenting the acidified liquor, removing the alcohol and concentrating the residual liquid to a thick liquor.

5. The process of treating sulfite liquor which comprises bringing such liquor to a boil, adding an amount of sulfuric acid about equivalent to the sulfite present, permitting sufficient evaporation to carry off the sulfur dioxid liberated, fermenting the acidified liquor and removing the alcohol and concentrating to a thick liquid.

6. The process of treating sulfite waste liquor which comprises bringing such liquor to a boil, adding about 0.2 per cent. sulfuric acid, cooling and fermenting the cooled and acidified liquor.

In testimony whereof, I affix my signature in the presence of two subscribing witnesses.

AL. LACKMAN.

Witnesses:
LEWIS N. FOOTE,
ISABELLE M. McGLYNN.